United States Patent
Turunen et al.

(12) 
(10) Patent No.: US 12,214,522 B2
(45) Date of Patent: Feb. 4, 2025

(54) ARRANGEMENT FOR FEEDING WOOD PARTICLES INTO IMPREGNATING

(71) Applicant: UPM-KYMMENE CORPORATION, Helsinki (FI)

(72) Inventors: Sami Turunen, Lappeenranta (FI); Mika Laitila, Hämeenlinna (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 437 days.

(21) Appl. No.: 17/426,254

(22) PCT Filed: Jan. 29, 2019

(86) PCT No.: PCT/EP2019/052133
§ 371 (c)(1),
(2) Date: Jul. 28, 2021

(87) PCT Pub. No.: WO2020/156645
PCT Pub. Date: Aug. 6, 2020

(65) Prior Publication Data
US 2022/0134595 A1    May 5, 2022

(51) Int. Cl.
*B27K 3/02* (2006.01)
*B27K 5/00* (2006.01)

(52) U.S. Cl.
CPC ............ *B27K 3/0207* (2013.01); *B27K 5/007* (2013.01)

(58) Field of Classification Search
USPC ............................ 118/716, 500, 428, 429, 66
See application file for complete search history.

(56) References Cited

U.S. PATENT DOCUMENTS

| | | | |
|---|---|---|---|
| 2013/0143289 A1 | 6/2013 | Van Der Meulen et al. | |
| 2014/0311480 A1 | 10/2014 | McDonald | |
| 2015/0132201 A1* | 5/2015 | Chheda ................. | C10G 1/065 422/232 |
| 2021/0207185 A1* | 7/2021 | Björklund ................. | B01J 4/02 |

FOREIGN PATENT DOCUMENTS

| | | | | |
|---|---|---|---|---|
| CN | 104160041 A | 11/2014 | | |
| CN | 105939844 A | * 9/2016 | ........... | B01D 33/009 |
| JP | H09 314521 A | 12/1997 | | |

(Continued)

OTHER PUBLICATIONS

English Translation CN105939844A (Year: 2016).*

(Continued)

*Primary Examiner* — Yewebdar T Tadesse
(74) *Attorney, Agent, or Firm* — NIXON PEABODY LLP (57) ABSTRACT

An arrangement for feeding wood particles into an impregnating stage of a wood treatment process comprises a feed silo (301, 701), at least one impregnating vessel (305, 601, 602, 603, 703) for receiving wood particles into said impregnating stage, and two or more conveyors (302, 303, 304, 501, 502, 503, 702) between said feed silo (301, 701) and said at least one impregnating vessel (305, 601, 602, 603, 703), for transferring wood particles from said feed silo (301, 701) to said at least one impregnating vessel (305, 601, 602, 603, 703). Each of said conveyors (302, 303, 304, 501, 502, 503, 702) is a compressing conveyor for applying pressure to the wood particles on their way through the respective conveyor.

10 Claims, 6 Drawing Sheets

(56) References Cited

FOREIGN PATENT DOCUMENTS

SU             1369303 A1    10/1996
WO    WO-2014039986 A1 *   3/2014   ........... C12M 21/18

OTHER PUBLICATIONS

Patent Search Report in Russian Patent Application No. RU 2021123757/10, mailed Mar. 4, 2022 (2 pages w/English translation).
Miguel Esteban Villalba Chehab et al., "Characterization of screw feeder compression and its effect on wood-chip cellulose accessibility", XP055757659, Jan. 1, 2018 (Jan. 1, 2018).
Written Opinion of the International Preliminary Examining Authority in International Patent Application No. PCT/EP2019/052133, mailed Dec. 15, 2020 (7 pages).
International Preliminary Report on Patentability in International Patent Application No. PCT/2019/052133, mailed Apr. 30, 2021 (17 pages).

* cited by examiner

ARRANGEMENT FOR FEEDING WOOD PARTICLES INTO IMPREGNATING

CROSS-REFERENCE TO RELATED APPLICATIONS

This application is a U.S. National Stage of International Application No. PCT/EP2019/052133, filed on Jan. 29, 2019, which is hereby incorporated by reference in its entirety.

FIELD OF THE INVENTION

The invention concerns the general technical field of converting biomass into chemical bioproducts in industrial scale. In particular the invention concerns the technology of pretreating wood particles and moving them between various pretreating stages.

BACKGROUND OF THE INVENTION

The production of biomass-based chemicals may use for example wood particles as the main raw material. In a biomass-to-sugar process the wood particles may be subjected to various kinds of pretreatment such as washing, impregnating with water and/or other liquids, and heating, in order to prepare them for the later stages of the process.

A pretreatment process may involve soaking the wood particles in steam or hot water, then soaking them in dilute acid, and subsequently taking the acid-impregnated wood particles into a hemihydrolysis reactor where a steam explosion reaction breaks the particles into reaction products such as cellulose, hemicellulose (so-called C5 sugar), and lignin. Mechanical conveyors such as screw feeders transfer the impregnated wood particles between the stages of the pretreatment process.

A screw feeder is an example of a compressing conveyor that applies a squeezing force to the transferred material. This is a useful property when the liquid content of the material needs to be influenced upon. As the material passes through the screw feeder it becomes compressed, removing some previously absorbed liquid and causing some—at least partially elastic—compressing deformation. Releasing the compressed material from the screw feeder makes it readily absorb a new impregnating liquid if one is available, as the elastic deformation relaxes.

Not only the actual pretreatment stages but also the conveyor solutions between them that move the wood particles forward in the process have an effect on how the process works, so they must be designed and dimensioned accordingly.

SUMMARY

According to a first aspect there is provided an arrangement for feeding wood particles into an impregnating stage of a wood treatment process. The arrangement comprises a feed silo, at least one impregnating vessel for receiving wood particles into said impregnating stage, and two or more conveyors between said feed silo and said at least one impregnating vessel. The conveyors are used for transferring wood particles from said feed silo to said at least one impregnating vessel. Each of said conveyors is a compressing conveyor for applying pressure to the wood particles on their way through the respective conveyor. According to a second aspect there is provided a method for feeding wood particles from a feed silo into an impregnating stage of a wood treatment process. The method comprises transferring the wood particles into at least one impregnating vessel for said impregnating stage using at least two compressing conveyors that apply pressure to the wood particles on their way through said at least two conveyors.

BRIEF DESCRIPTION OF THE DRAWINGS

The accompanying drawings, which are included to provide a further understanding of the described embodiments and constitute a part of this specification, illustrate various advantageous features and examples of their combinations. In the drawings.

DETAILED DESCRIPTION

Numerical attributes such as first, second, third, and so on are used in this description and the appended claims for the purpose of giving unambiguous names to concepts. They do not refer to any particular order, unless otherwise explicitly stated.

In the context of this description the term wood particles refers to a material that consists mainly of pieces of wood formed by cutting or chipping larger pieces of wood such as trees, branches, logging residues, stumps, roots, and wood waste. The size of the wood particles may vary in a wide range from a few millimetres to a few centimetres, so the wood particles meant here are typically larger than those meant with the term sawdust. The wood used to make wood particles may be debarked or it main contain bark. For a wood-to-sugar process the preferred raw material is broad-leaf wood due to its relatively high inherent sugar content, but the use of other kinds of wood is not excluded. The terms wood chips, wooden chips, or just chips can be used to mean the same thing as wood particles. The term chips is used in the appended drawing because it is short.

Figure 1:
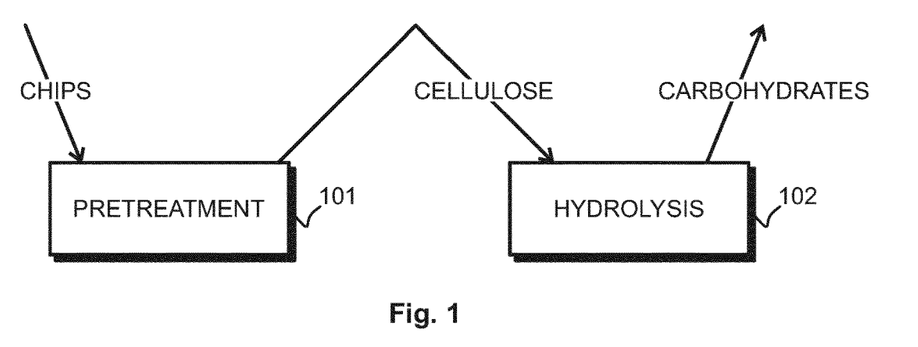
FIG. 1 illustrates a chemical refining process on a general level.

FIG. 1 illustrates schematically how in a method and arrangement for treating wood particles the wood particles may go to pretreatment, schematically illustrated as 101. The purpose of the pretreatment 101 is to prepare the incoming wood particles for efficient use in the process, by removing some unwanted impurities, by compensating for some of the natural fluctuations in the characteristics of the material, and by breaking down the natural structure of the wood material. Hemicellulose (C5 sugars) can be collected from the pretreatment 101, and cellulose (or lignocellulosic material) can be taken further to a hydrolysis 102 to produce carbohydrates of desired kind.

Figure 2:
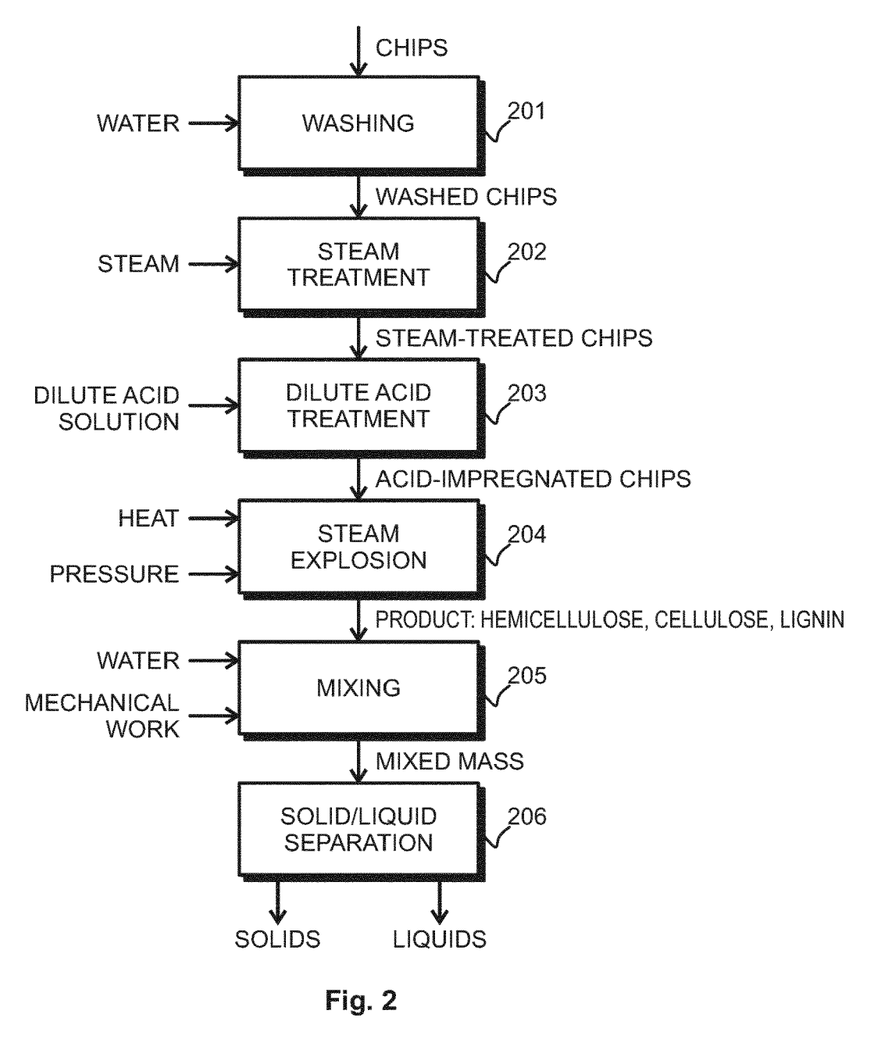
FIG. 2 illustrates an example of process stages in pretreatment.

FIG. 2 illustrates an example of a product flow through various stages that all belong to the pretreatment 101 of FIG. 1. Washing 201 is done with water, removing some mainly inorganic impurities such as sand. Washed wood particles are taken to steam treatment 202 for the purpose of removing air from inside the wood particles and to preheat them to an elevated temperature. Steam-treated wood particles are taken to dilute acid treatment 203 for impregnating them with a dilute acid solution. The aim of the dilute acid treatment 203 is to make the dilute acid solution penetrate into the wood particles as evenly as possible.

The acid-impregnated wood particles are taken to hemihydrolysis (not separately shown in FIG. 2) where they are under elevated pressure and temperature. At the output of the hemihydrolysis the wood particles undergo a steam explosion 204 that breaks their structure. The output stream from the steam explosion 204 goes through steam separation (not separately shown) to mixing 205 where water is added and the resulting mass is homogenized mechanically to break up agglomerates. Solids and liquids may then be separated at 206 for feeding into later process stages.

It has been found that in a pretreatment process of a commercially viable scale the use of a known plug screw feeder to feed wood particles into an impregnating stage may result in less than optimal impregnating. This is an important finding, because spatially even absorption of the dilute acid solution in the wood particle would be highly desirable: it affects the quality of the product later in the process. The relatively large flow rates of a commercially viable wood-to-sugar process mean that it is not feasible to assume that a wood particle would spend more than some minutes in the impregnating vessel 401. Aiming at longer times would mean that the impregnating vessel 401 would need to be larger than is practical to build. However, after only some minutes under the influence of the acidic solution the wood particle may not have been fully penetrated, or at least the spatial distribution of acid inside the wood particle is not completely even. This problem is made even worse if the wood particle was not in optimal condition (shape, size, amount of bark in unbarked feedstock, not compressed enough) for absorbing the dilute acid solution when it came to the impregnating stage.

The compression ratios of commercially available plug screw feeders are between 1.5 and 6, and the compression ratio tends to become lower when one goes towards larger equipment and larger material flows. This is an underlying cause of the problem that in commercially viable, industrial scale processes the work done on the wood particle in the compressing conveyor before an impregnating stage may not be sufficient for effective impregnation.

It has been found that more efficient compressing, and consequently a better initial condition of the wood particles for impregnating, can be achieved by using two or more conveyors between the pre-steaming silo and the impregnating vessel(s). This way the compressing work done per wood particle by an individual conveyor becomes larger.

Figure 3:
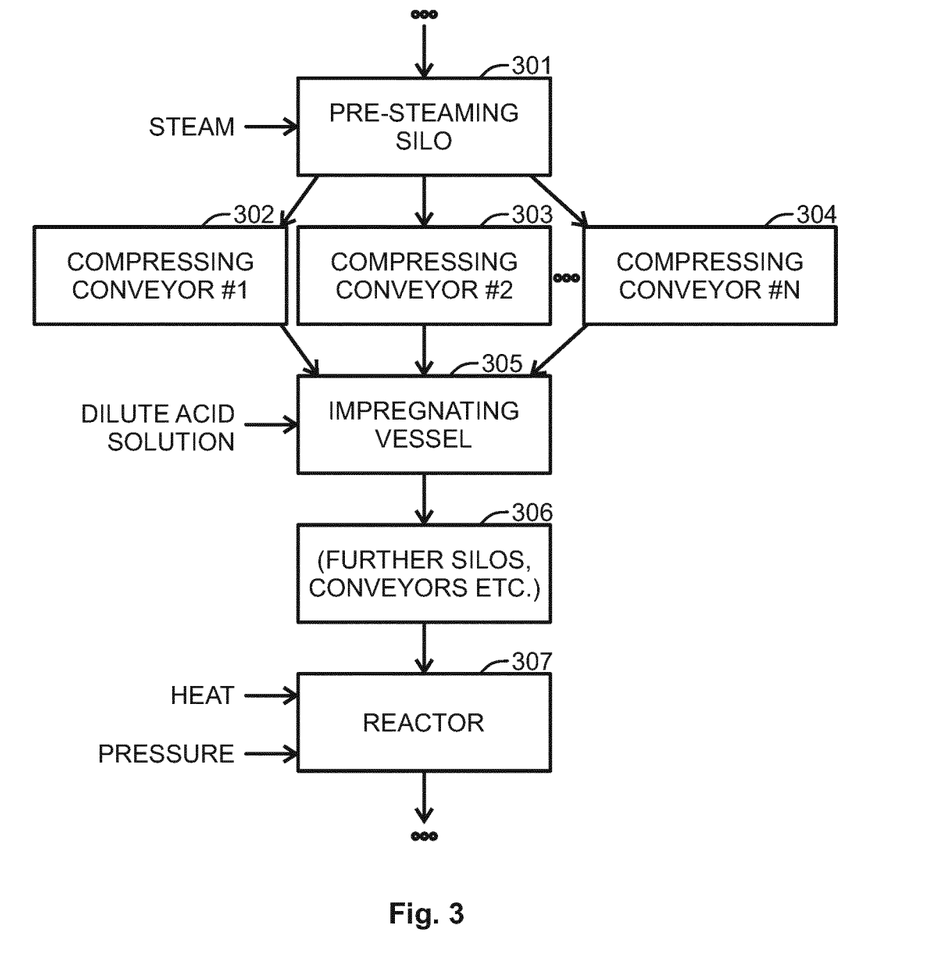
FIG. 3 illustrates an example of process stages and equipment.

FIG. 3 illustrates schematically a part of an arrangement for pretreating wood particles in a wood treatment process. As a part thereof there is an arrangement for feeding the wood particles into an impregnating stage of the wood treatment process. The arrangement comprises a feed silo, which in the embodiment of FIG. 3 is a pre-steaming silo 301 for treating the wood particles with steam. The arrangement comprises an impregnating vessel 305 for receiving wood particles in the impregnating stage that is discussed here. The impregnating vessel 305 comprises an input for a dilute solution of an acid, such as sulphuric acid, for soaking the received wood particles in said dilute acid solution in order to prepare them for hemihydrolysis and steam explosion in a reactor 307 further downstream in the process. Other acids that could be used for said impregnation comprise—but are not limited to—nitric acid, phosphoric acid, lactic acid, acetic acid, formic acid and carbonic acid.

The arrangement comprises two or more conveyors 302, 303, and 304 between the pre-steaming silo 301 and the impregnating vessel 305 for transferring wood particles from the pre-steaming silo 301 to the impregnating vessel 305. Each of these conveyors is a compressing conveyor for applying pressure to the wood particles on their way to through the respective conveyor.

Concerning the feed silo, which in FIG. 3 is the pre-steaming silo 301, it is not a necessary requirement that it is used for pre-steaming. As was described above with reference to FIG. 2, advantageous effects of pre-steaming include removing air from inside the wood particle and preheating. These or corresponding effects can be achieved otherwise than by applying steam; for example various vacuum and microwave related techniques can be used. If the silo is a presteaming silo, the steam used therein may be pure steam of water or it may contain additives, such as some acid, to enhance the desired effect. The fact that the conveyors 302 to 304 are fed from a silo has an advantageous effect, because stable operation and constant effect on the transferred material of plug screw feeders of force feed screws (which are examples of compressing conveyors) are easy to achieve by using a silo for feeding and by maintaining the surface level of the material inside the silo sufficiently high.

Taken the relatively large flow rates of a commercially viable wood-to-sugar process it is not feasible to assume that a wood particle would spend more than some minutes in the impregnating vessel 305. Aiming at longer times would mean that the impregnating vessel 305 would need to be larger than is practical to build. However, after only some minutes under the influence of the acidic solution the acid may not have fully penetrated the wood particle, or at least the spatial distribution of acid inside the wood particle may not be completely even. It has been found advantageous to provide a soaking silo as a temporary storage in which the spatial distribution of acid inside the wood particle has time to even out. In the schematic presentation of FIG. 3 the soaking silo would appear in block 306. The residence time in the soaking silo 502 may be in the orders of some tens of minutes. In an embodiment the residence time in the soaking silo 502 is not more than 60 minutes. In another, preferred embodiment the residence time in the soaking silo 502 is not more than 30 minutes.

In the arrangement of FIG. 3 the two or more conveyors operate in parallel. That is, each of the two or more conveyors 302 to 304 comprises a respective conveyor input and a respective conveyor output, and the conveyor inputs are coupled to the presteaming silo 301 in parallel for receiving a respective component stream of wood particles from the pre-steaming silo 301. There is only one, common impregnating vessel 305, which is coupled to at least two (here: all) of the conveyor outputs for receiving at least two (here: all) of the component streams.

Taken that there is a certain gross material flow through the process, each of the N parallel compressing conveyors (N=2, 3, conveys an 1/N fraction of the gross material flow. In total, N times the work of an individual compressing conveyor is performed on the material flow. This ensures much more thoroughly conditioned wood particles at the beginning of the impregnating stage in the impregnating vessel 305 than if only one compressing conveyor would be used for transferring.

Figure 4:
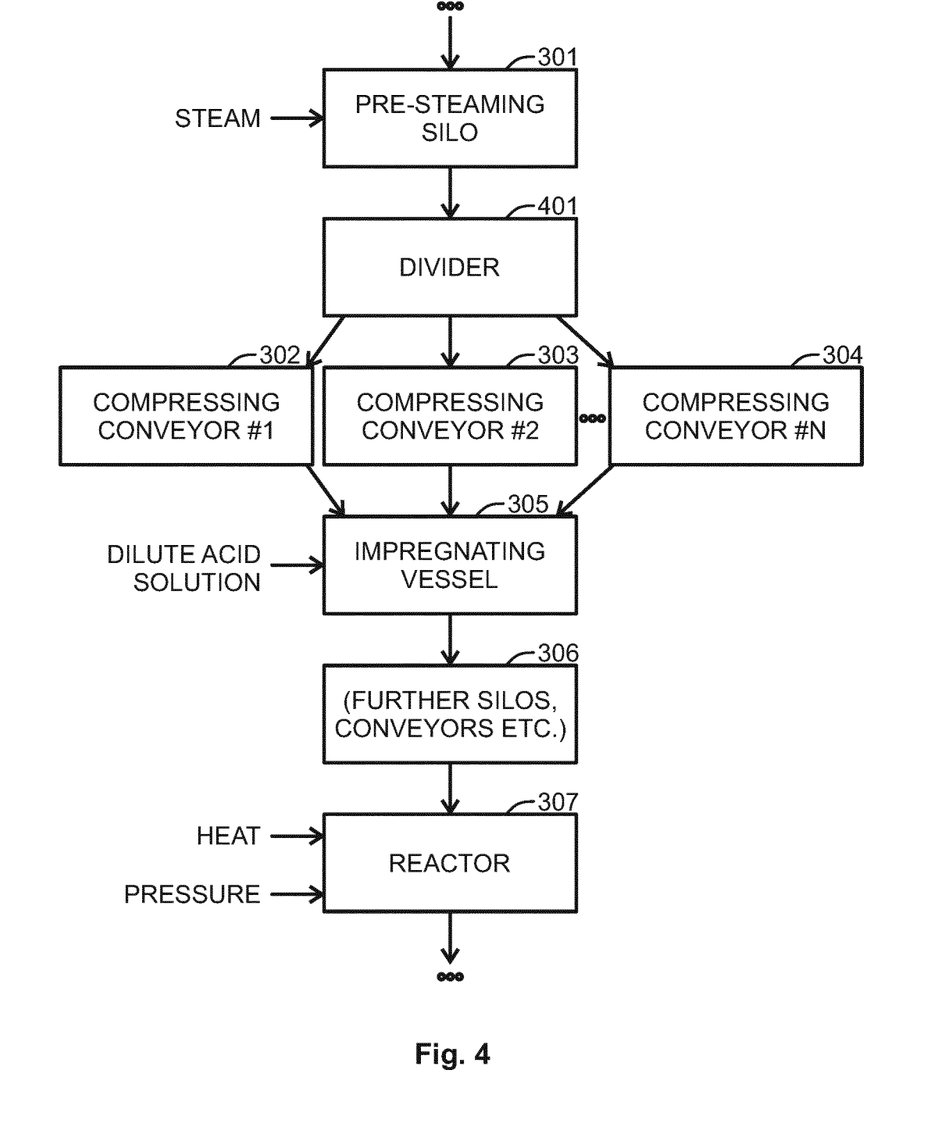
FIG. 4 illustrates another example of process stages and equipment.

FIG. 4 illustrates an embodiment that is otherwise similar to that of FIG. 3 but there is provided a divider 401 between the feed silo (the pre-steaming silo 301) and the conveyor inputs for dividing wood particles from the feed silo into the component streams. In FIG. 3 it was assumed that the conveyor inputs were simply installed at the bottom of the presteaming silo 301. The divider 401 may be a static, mechanical divider like a wedge-shaped barrier that mechanically guides wood particles from the pre-steaming silo 301 to the conveyor inputs. Additionally or alternatively it may comprise conveyors of its own, like a double screw feeder that receives a flow of wood particles from the silo in the middle and that exhibits helixes of opposite handedness towards its two ends.

Figure 5:
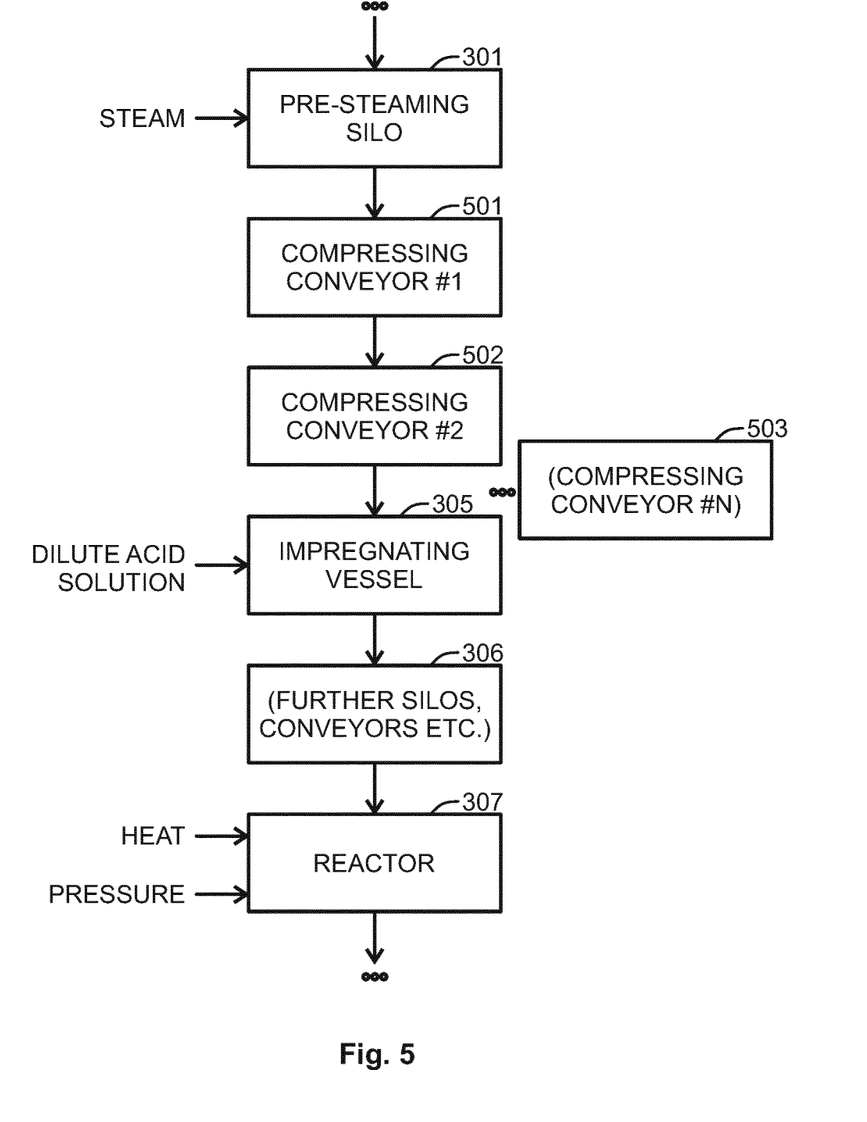
FIG. 5 illustrates another example of process stages and equipment.

FIG. 5 illustrates an embodiment in which the compressing conveyors operate in series. That is, each of the two or more conveyors 501 to 503 comprises a respective conveyor input and a respective conveyor output, of which only the conveyor input of a first conveyor 501 is coupled to the feed silo (the pre-steaming silo 301) for receiving wood particles from the feed silo. The conveyor output of the first conveyor 501 is coupled to the conveyor input of the second conveyor 502 for transferring the wood particles through said first 501 and second 502 conveyors in sequence on their way from the feed silo to the impregnating stage. FIG. 5 illustrates schematically the possibility of having more than two compressing conveyors in series (see block 503 in FIG. 5).

In an embodiment where two or more compressing converters operate in series, in order to fully achieve the advantageous effect of double compressing work on the wood particle the compression stages should follow each other directly enough, with minimum delay in between so that the mechanical deformation achieved in a preceding compression does not relax too much before the next compression. Therefore the conveyor output of the preceding conveyor is most advantageously directly coupled to the conveyor input of the next conveyor, with few or no intermittent pieces of apparatus therebetween.

Figure 6:
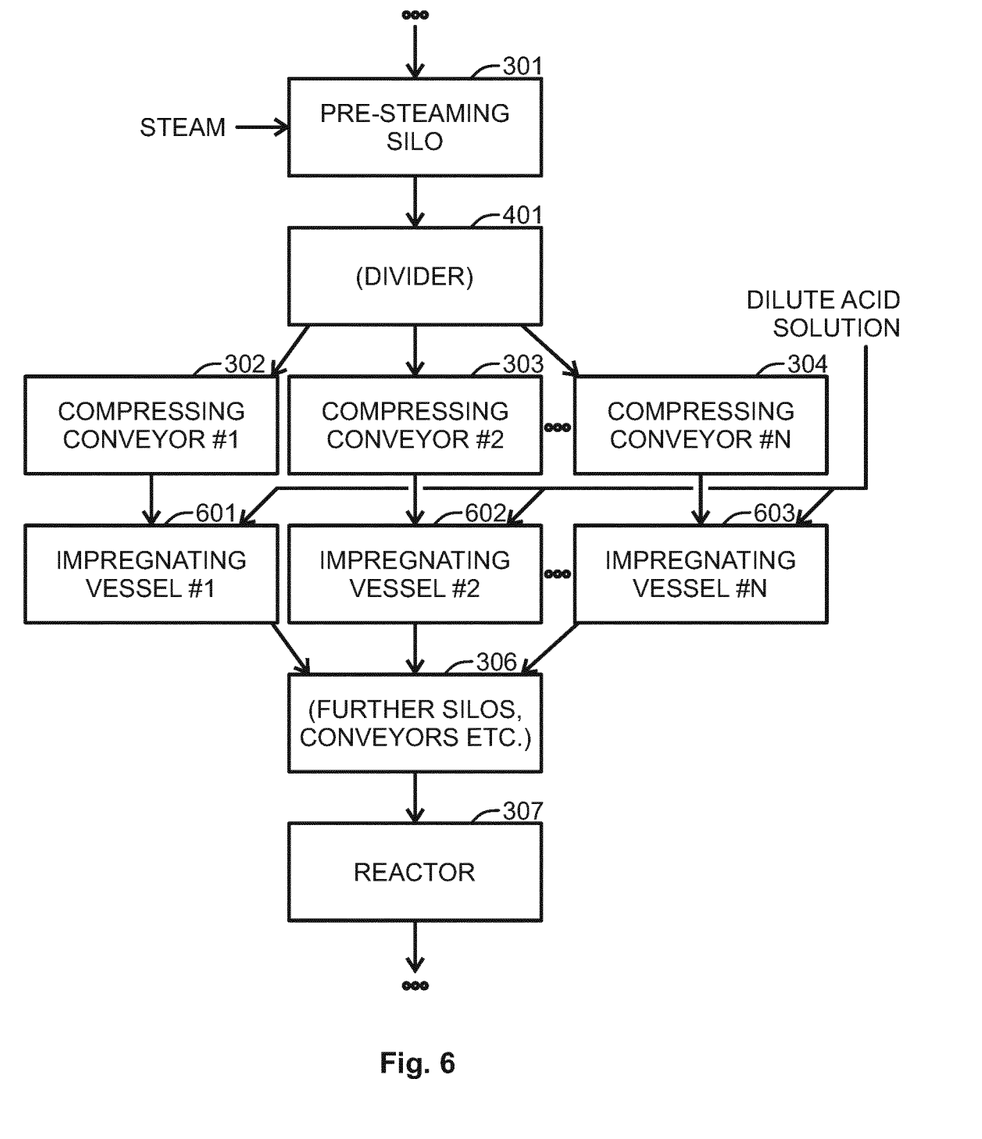
FIG. 6 illustrates another example of process stages and equipment.

FIG. 6 illustrates an embodiment that is otherwise similar to that of FIG. 3 or FIG. 4 (the divider 401 being optional) but there are separate impregnating vessels coupled to at least two of the compressing conveyors 302 to 304. That is, a first impregnating vessel 601 is coupled to the conveyor output of a first conveyor 302 to receive a first component stream, and a second impregnating vessel 602 is coupled to the conveyor output of a second conveyor 303 to receive a second component stream. The arrangement comprises a combiner stage after said first 601 and second 602 impregnating vessels for combining outputs of the first 601 and second 602 impregnating vessels to a later stage of the wood treatment process. In the schematic presentation of FIG. 6 the combiner stage is included in block 306.

Figure 7:
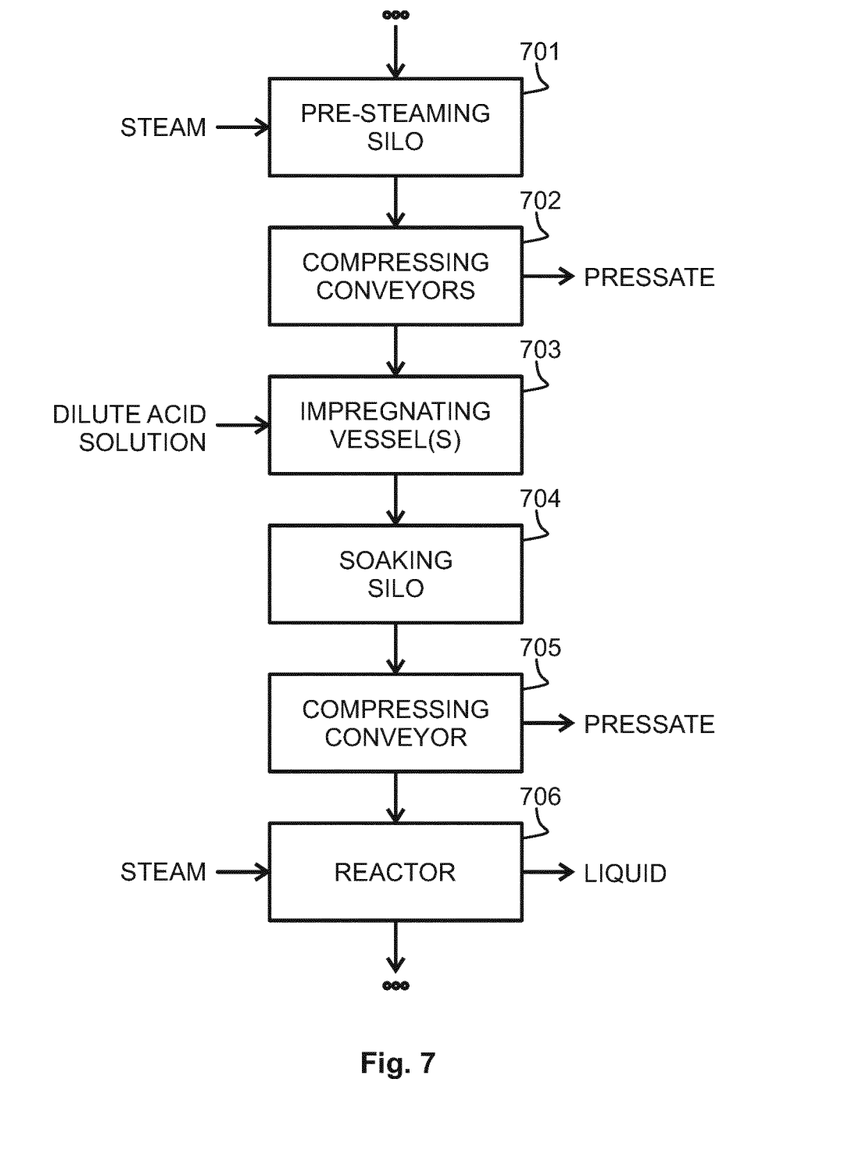
FIG. 7 illustrates another example of process stages and equipment.

An additional advantageous effect of using at least two compressing conveyors before the impregnating stage has been found when some further stages of the process are considered in more detail. FIG. 7 illustrates schematically an apparatus for pretreating wood particles. A pre-steaming silo 701 is provided for treating the wood particles with steam, i.e. implementing at least part of the stage shown as stage 202 in FIG. 2. At least two compressing conveyors 702 are provided for transferring steam-treated wood particles from the pre-steaming silo 701 to one or more impregnating vessels 703 in which the dilute acid treatment stage 203 of FIG. 2 is implemented. Downstream from the one or more impregnating vessels 703 there may be provided one or more soaking silos 704 for giving the dilute acid solution more time to penetrate into the inner parts of the wood particles. One or more further compressing conveyors 705 may be used to transfer the acid-impregnated wood particles into a reactor 706 in which the hemihydrolysis reaction takes place and at the output of which the steam explosion takes place.

The dry matter content and acid content of the material that goes into the reactor 706 are important process parameters, because they have an effect on how the desired reactions proceed in the reactor 706 and downstream from it in the process. The reactor 706 is pressurized, and the compressing capability of the immediately preceding compressing conveyor 705 may be used to aid the feeding of the material flow into the reactor 706.

Now when two or more compressing conveyors 702 have been used before the impregnating vessel(s) 703, the penetration of dilute acid solution into the wood particle may be more complete than if only one compressing conveyor had been used at stage 702; the material may be "wetter" of dilute acid. The extent to which this occurs can be controlled by controlling, among others, the operation of the compressing conveyors 702. In order to achieve the desired dry matter content and acid content at the input of the reactor 706, the operation of the later compressing conveyor 705 can be controlled. There is a wider control window, i.e. more accurate controlling possibilities, for the last-mentioned due to the fact that two or more compressing conveyors were used at stage 702.

It is obvious to a person skilled in the art that with the advancement of technology, the ideas explained above may be implemented in various ways. The claimed scope is thus not limited to the examples described above.

The invention claimed is:

1. An arrangement for processing wood particles, comprising:
   a feed silo;
   at least one impregnating vessel configured to subject wood particles received therein to an impregnating stage of said wood treatment process;
   for feeding said wood particles into said impregnating stage, two or more conveyors between said feed silo and said at least one impregnating vessel, for transferring said wood particles from said feed silo to said at least one impregnating vessel; and
   downstream from said impregnating stage in the process, a reactor configured to subject wood particles impregnated in said impregnating stage to hemihydrolysis and steam explosion;
   wherein each of said two or more conveyors is a compressing conveyor is configured to apply pressure to the wood particles on their way through the respective conveyor and comprises a respective conveyor input and a respective conveyor output, and wherein the conveyor inputs of said two or more conveyors are coupled to said feed silo in parallel for receiving a respective component stream of the wood particles from said feed silo for causing an elastic compressing deformation of the wood particles in said two or more conveyors and subsequently relaxing the elastic deformation when releasing the wood particles into the impregnating stage.

2. The arrangement according to claim 1, wherein said feed silo is a pre-steaming silo for treating said wood particles with steam.

3. The arrangement according to claim 1, wherein each of said two or more conveyors is a plug screw feeder or a force feed screw.

4. The arrangement according to claim 1, further comprising a divider between said feed silo and said conveyor inputs for dividing the wood particles from said feed silo into said component streams.

5. The arrangement according to claim 1, wherein one of said at least one impregnating vessels is coupled to at least two of said conveyor outputs for receiving at least two of said component streams.

6. The arrangement according to claim 1, wherein
   a first of said at least one impregnating vessel is coupled to the conveyor output of a first of said two or more conveyors, to receive a first component stream of said component streams,
   a second impregnating vessel is coupled to the conveyor output of a second of said two or more conveyors, to receive a second of said component streams,
   the arrangement further comprising a combiner stage after said first and second impregnating vessels for combining outputs of said first and second impregnating vessels.

7. The arrangement according to claim 1, wherein said impregnating stage comprises soaking said wood particles in a dilute acid solution.

8. An arrangement for processing wood particles, comprising:
   a feed silo;
   at least one impregnating vessel configured to receive wood particles received therein to an impregnating stage of said wood treatment process;
   for feeding said wood particles into said impregnating stage, two or more conveyors between said feed silo and said at least one impregnating vessel, for transferring wood particles from said feed silo to said at least one impregnating vessel; and
   downstream from said impregnating stage, a reactor configured to subject wood particles impregnated in said impregnating stage to hemihydrolysis and steam explosion;
   wherein each of said two or more conveyors is a compressing conveyor for applying pressure to the wood particles on their way through the respective conveyor and comprises a respective conveyor input and a respective conveyor output,
   wherein each of said two or more conveyors is a plug screw feeder, and the conveyor input of a first conveyor of said two or more conveyors is coupled to said feed silo for receiving said wood particles from said feed silo, and
   the conveyor output of said first conveyor is coupled to the conveyor input of a second conveyor of said two or more conveyors for transferring said wood particles through said first and second conveyors in sequence on their way from said feed silo to said impregnating stage for causing an elastic compressing deformation of the wood particles in said two or more conveyors and subsequently relaxing the elastic deformation when releasing the wood particles into the impregnating stage.

9. The arrangement according to claim 8, wherein said feed silo is a pre-steaming silo for treating said wood particles with steam.

10. The arrangement according to claim 8, wherein
    a first of said at least one impregnating vessel is coupled to the conveyor output of a first of said two or more conveyors, to receive a first component stream of said component streams,
    a second impregnating vessel is coupled to the conveyor output of a second of said two or more conveyors, to receive a second of said component streams,
    the arrangement further comprising a combiner stage after said first and second impregnating vessels for combining outputs of said first and second impregnating vessels.

* * * * *